(12) United States Patent
Wong

(10) Patent No.: US 9,677,583 B1
(45) Date of Patent: Jun. 13, 2017

(54) HOLDER FOR A SEAMLESS CONTROL CORD OF A CURTAIN

(71) Applicant: Ming Lu Wong, Kaohsiung (TW)

(72) Inventor: Ming Lu Wong, Kaohsiung (TW)

( * ) Notice: Subject to any disclaimer, the term of this patent is extended or adjusted under 35 U.S.C. 154(b) by 0 days.

(21) Appl. No.: 15/188,677

(22) Filed: Jun. 21, 2016

(30) Foreign Application Priority Data

May 30, 2016 (TW) .............................. 105208052 U

(51) Int. Cl.
*E06B 9/324* (2006.01)
*F16B 2/12* (2006.01)
*F16M 13/02* (2006.01)

(52) U.S. Cl.
CPC ................ *F16B 2/12* (2013.01); *E06B 9/324* (2013.01); *F16M 13/02* (2013.01)

(58) Field of Classification Search
CPC ... A47H 3/02; E06B 2009/3265; E06B 9/326; E06B 9/324326; Y10T 24/3969; Y10T 24/3984
See application file for complete search history.

(56) References Cited

U.S. PATENT DOCUMENTS 8,650,720 B2    2/2014   Wicker et al.

*Primary Examiner* — David Upchurch
(74) *Attorney, Agent, or Firm* — Guice Patents PLLC

(57) ABSTRACT

A holder for a seamless control cord of a curtain for quickly fixing the seamless control cord or a bead chain is composed of a base seat, an outer cover and elastic members and fixed on a wall face by fixing members. The base seat and the outer cover are respectively formed with two perforations. Each perforation has a cord passage formed on the same axis. When holding the control cord, the seamless control cord is directly passed through the cord passage of the outer cover into the perforation and then passed through the cord passage of the base seat into the perforation. Then, the elastic members push the outer cover to misalign the two perforations so as to hold the control cord and fully fix the control cord. Under such circumstance, the control cord is prevented from swinging or a child cannot play the control cord.

5 Claims, 9 Drawing Sheets

HOLDER FOR A SEAMLESS CONTROL CORD OF A CURTAIN

BACKGROUND OF THE INVENTION

1. Field of the Invention

The present invention relates generally to a holder for a seamless control cord of a curtain, and more particularly to a holder for a seamless control cord of a curtain, which can quickly install and securely locate the seamless control cord.

2. Description of the Related Art

With respect to the opening/closing control of a common curtain, a control cord or bead chain is generally used to control the opening/closing and motion of the curtain. The control cord or bead chain often naturally suspends from one side of the curtain assembly to a lower position without being located. Under such circumstance, a child can easily play the control cord or bead chain or even tangle the control cord or bead chain with his neck. This often causes danger of the child's life.

In order to solve the above problem, some manufacturers have developed various holders for locating the control cord or bead chain on the wall. For example, U.S. Pat. No. 8,650,720 discloses a control cord holder (as shown in FIG. 1). The control cord holder is composed of an inner seat A, an outer seat B and elastic members. The control cord and the holder are installed in such a manner that the control cord or bead chain is first passed through a misaligned space formed of the holding holes C of the inner and outer seats A, B. After the elastic members push and abut against the inner and outer seats A, B to securely hold the control cord or bead chain, the holder is locked on the wall by means of fixing screws. After the holder is locked on the wall, the holding holes of the inner and outer seats can be aligned with each other to release the control cord or bead chain from the holding state. In a not held state, two ends of the control cord is connected by a connector D to complete the installation of the control cord and the holder.

The object of the holder structure of the above patent is simply to locate the control cord or bead chain on the wall face, not to securely hold the control cord or bead chain and prevent the control cord or bead chain from swinging. In addition, the holder structure of the above patent is inapplicable to the installation of a seamless control cord. This is because the seamless control cord is a loop structure and the holder structure of the above patent has closed holding holes. Therefore, it is impossible to make the seamless control cord enter the holding holes. Under such circumstance, the holder structure of the above patent is only applicable to those control cord or bead chain connected by a connector. Accordingly, the application range of the holder structure of the above patent is limited. Furthermore, it seems that the technical concept and effect of the holder of U.S. Pat. No. 8,650,720 fail to meet the function shown in the drawings or recited in the specification of the patent. Especially, when the holder is affixed to the wall face with the fixing screws, the two holes are aligned with each other. Therefore, as shown in FIGS. 3 to 5 of the above patent, the control cord or bead chain passing through the holes is not securely held, but will still swing and is easy to pull and play by a child. To prevent the control cord or bead chain from swinging or being pulled and played by a child, it is necessary to first pull straight the control cord or bead chain and then lock the holder (as shown in FIG. 5 of the above patent). In this case, it is inconvenient to operate the control cord or bead chain. Obviously, the holder structure of the above patent fails to meet the effect and object to be achieved by the above patent. In other words, the above patent can simply locate the control cord or bead chain on the wall face, while failing to fully securely hold the control cord or bead chain and hinder the control cord or bead chain from swinging. Therefore, the holder structure of the above patent still needs to be improved.

SUMMARY OF THE INVENTION

It is therefore a primary object of the present invention to provide a holder for securely installing a seamless control cord of a curtain. The installation of the seamless control cord in the holder is simplified. Also, the seamless control cord is prevented from freely swinging or being pulled or played by a child. By means of the holder, the seamless control cord can be quickly installed and securely held to ensure safety.

To achieve the above and other objects, the holder for a seamless control cord of a curtain of the present invention is designed to improve the holder structure of U.S. Pat. No. 8,650,720. The holder is composed of a base seat, an outer cover, elastic members and fixing members. A rear end of the base seat is formed with a tablet attachable to a wall face. A connection section protrudes from a front end of the base seat. The connection section has two receiving sockets. A platform is connected between the two receiving sockets. A circular perforation is formed on the platform. A middle line of the front end of the circular perforation is formed with a cord slit for a seamless control cord to enter the circular perforation from outer side. The front edge of the cord slit is formed with a guide slope in communication with the cord slit. A cord-stop ridge section is formed at a rear end of the cord slit. The cord slit extends to the rear end of the cord-stop ridge section to communicate with the circular perforation. The outer cover is formed with an internal space for receiving the connection section of the base seat therein. A circular perforation is formed through the outer cover between upper and lower faces thereof in a position corresponding to the circular perforation of the platform of the base seat. The tangent lines of two sides of the circular perforation extend to define a structural range of the outer cover. The structural range is downward recessed, whereby the thickness of the outer cover within the structural range is thinner to forma thinner structure. A middle line of the thinner structure is formed with a cord passage in communication with the circular perforation and the outer side of the outer cover. Accordingly, the seamless control cord (or bead chain) can be directly passed through the cord passage from the outer side of the outer cover into the circular perforation. The front edge of the outer cover is formed with an arched structure to prevent a user from colliding with the outer cover so as to protect the user from getting hurt and ensure safety.

According to the above arrangement, the holder of the present invention is advantageous in that after the base seat, the outer cover and the elastic members are assembled, the holder is first affixed to a predetermined wall face with fixing members. Then, the suspending loop-like control cord is directly passed through the cord passage of the outer cover into the circular perforation and then passed through the cord slit of the base seat into the circular perforation of the base seat. Accordingly, the cord section of the control cord is just held in the gap between the two misaligned circular perforations of the base seat and the outer cover under the elastic pushing force of the elastic members. Therefore, the control cord is located by the cord-stop ridge section and securely held by the holder without swinging. Under such circumstance, the control cord is prevented from being pulled and played by a child. Also, by means of the holder, the seamless control cord can be quickly installed and securely held to ensure safety.

The present invention can be best understood through the following description and accompanying drawings, wherein:

DETAILED DESCRIPTION OF THE PREFERRED EMBODIMENTS

Figure 1:
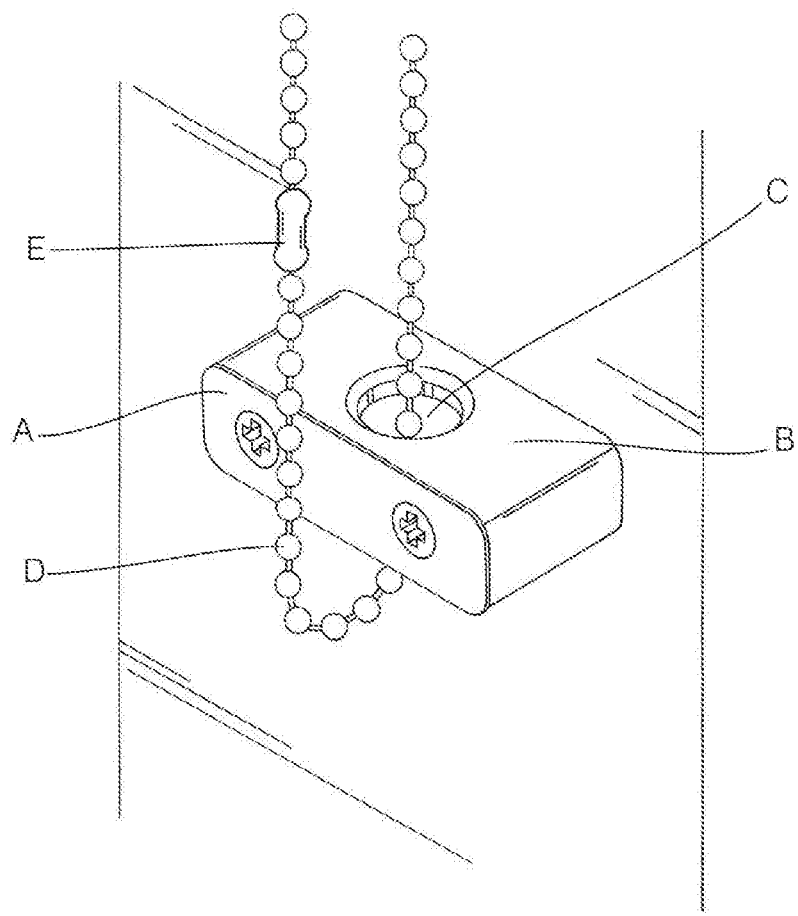
FIG. 1 is a perspective view showing the structure of U.S. Pat. No. 8,650,720.
Figure 2:
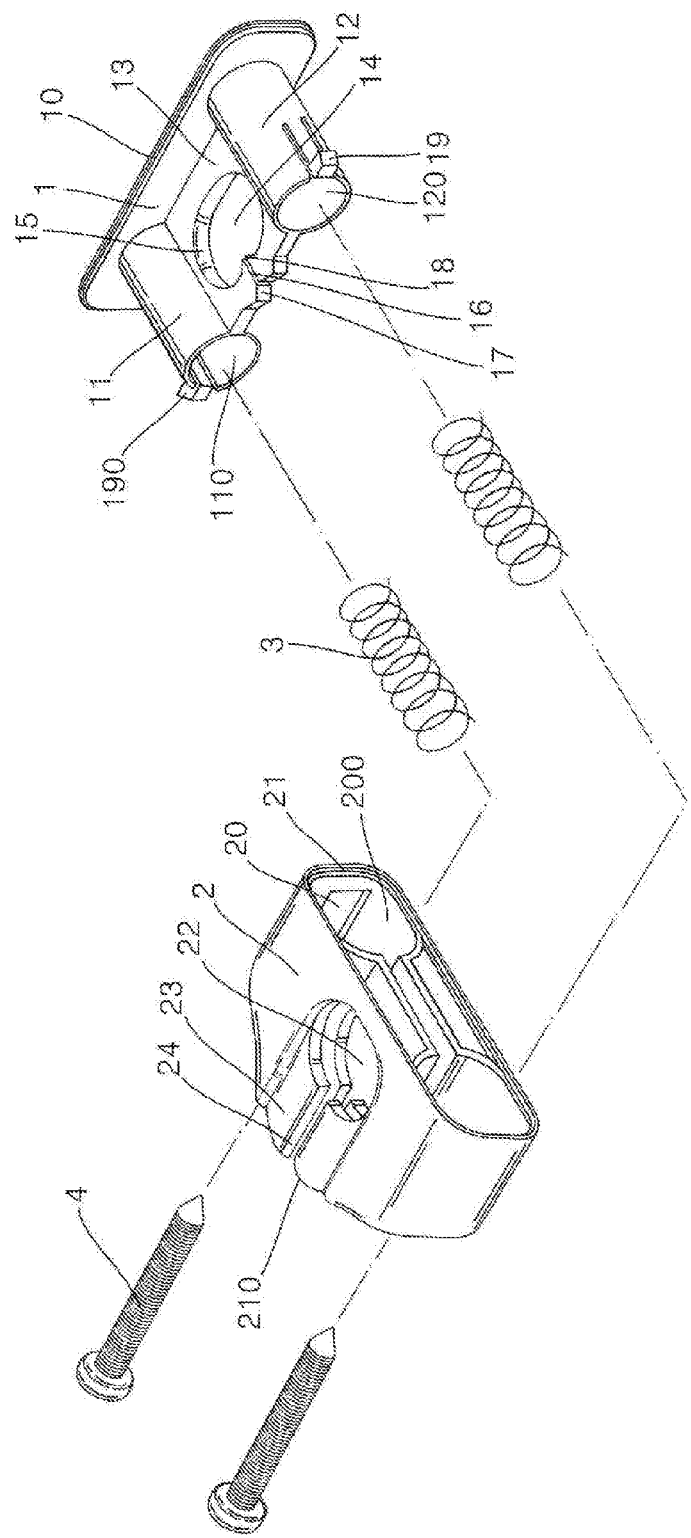
FIG. 2 is a perspective exploded view of the present invention.

Please refer to FIG. 2. The holder of the present invention includes a base seat 1, an outer cover 2, elastic members 3 and fixing members 4. The rear end of the base seat 1 is a tablet 10 for attaching the base seat 1 on a wall face. A connection section protrudes from a front face of the tablet 10. The connection section has two cylindrical bodies 11, 12 respectively formed with two receiving sockets 110, 120. The two elastic members 3 are respectively received in the receiving sockets 110, 120. A thin platform 13 is integrally connected between the two cylindrical bodies 11, 12. A circular perforation 14 is formed through the platform 13 between the upper and lower faces thereof. The upper and lower circumferences of the circular perforation 14 are formed as an arched structure 15. A middle line of the front end is formed with a cord slit 16 for a seamless control cord to enter the circular perforation 14 from outer side. In order to more easily guide the seamless control cord into the cord slit 16, the cord inlet end of the cord slit 16 is formed with a guide slope 17. In contrast, a cord-stop ridge section 18 is formed on the cord outlet end of the cord slit 16. Therefore, the seamless control cord is restricted in the circular perforation 14 without easily passing through the cord slit 16 out of the circular perforation 14.

Figure 3:
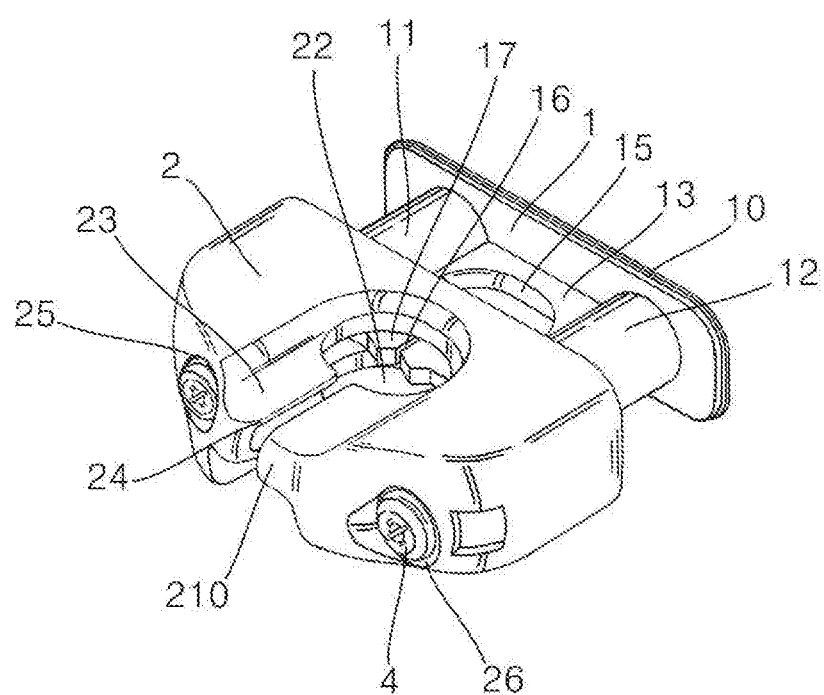
FIG. 3 is a perspective assembled view of the present invention.

Two engagement blocks 19, 190 are disposed on outer sides of the two cylindrical bodies 11, 12 for correspondingly engaging with the channels 20 formed on inner face of the outer cover 2. Accordingly, by means of the engagement blocks 19, 190, the outer cover 2 can slide along the two cylindrical bodies 11, 12 within the length range thereof. The outer cover 2 is formed with an internal space 200 having a configuration in conformity with the base seat 1 for receiving the base seat 1 therein. A stepped structure 21 is formed on inner edge of the opening of the space 200 for sealedly connecting with the tablet 10 of the base seat 1. The front end of the outer cover 2 is formed with an arched structure 210 to beautify the appearance and prevent a user from colliding with the outer cover 2 so as to avoid danger. A circular perforation 22 is formed through the outer cover 2 between upper and lower faces thereof in a position corresponding to the circular perforation 14 of the platform 10 of the base seat 1. The tangent lines of two sides of the circular perforation 22 extend to define a structural range of the outer cover 2. The structural range is downward recessed, whereby the thickness of the outer cover 2 within the structural range is thinner to form a thinner structure 23. The middle line of the thinner structure 23 is formed with a cord passage 24 in communication with the circular perforation 22 and the outermost side of the outer cover 2. Accordingly, the seamless control cord can be conveniently directly passed through the cord passage 24 from the outer side of the outer cover 2 into the circular perforation 22. In addition, with reference to FIG. 3, the outer side of the front end of the outer cover 2 is formed with through holes 25, 26 corresponding to the cylindrical bodies 11, 12 of the base seat 1. The fixing members 4 are passed through the through holes 25, 26 to correspondingly assemble the outer cover 2 with the base seat 1 and locate the elastic members in the cylindrical bodies 11, 12 and the internal space of the outer cover 2. Accordingly, the outer cover 2 is elastically assembled with the base seat 1 to form the holder main body of the present invention (as shown in FIG. 3).

Figure 4:
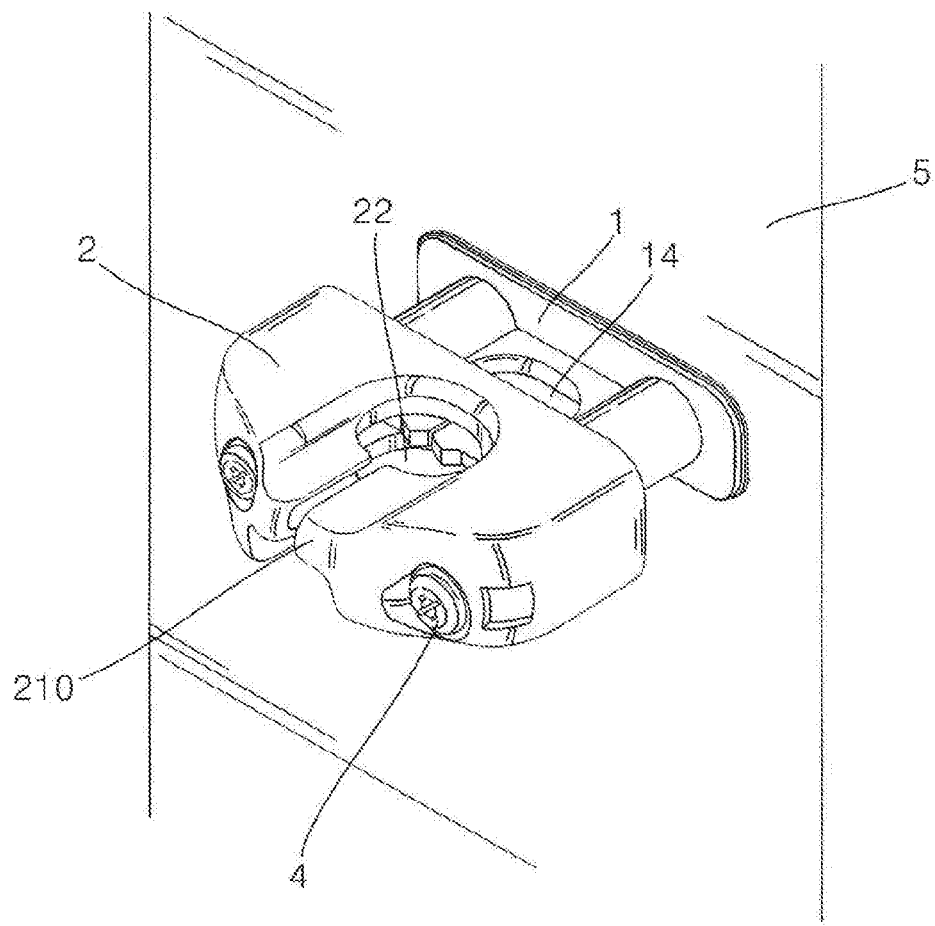
FIG. 4 is a perspective view showing that the holder of the present invention is locked on a wall face.

As shown in FIG. 4, the holder of the present invention is installed in such a manner that the holder can be first horizontally or vertically locked on a wall face 5 by means of the fixing members 4. After locked, the outer cover 2 is not totally mated with the base seat 1 to seal the base seat 1, but is spaced from the base seat 1 by a certain distance. At this time, the circular perforation 14 of the base seat 1 is misaligned from the circular perforation 22 of the outer cover 2 and the arched structure 210 of the outer side of the outer cover 2 is positioned at the outermost end. Under such circumstance, in case a user collides with the outer cover 2, not only the outer cover 2 has elasticity to cushion the impact force, but also the arched structure 210 can protect the user from being injured.

Figure 5:
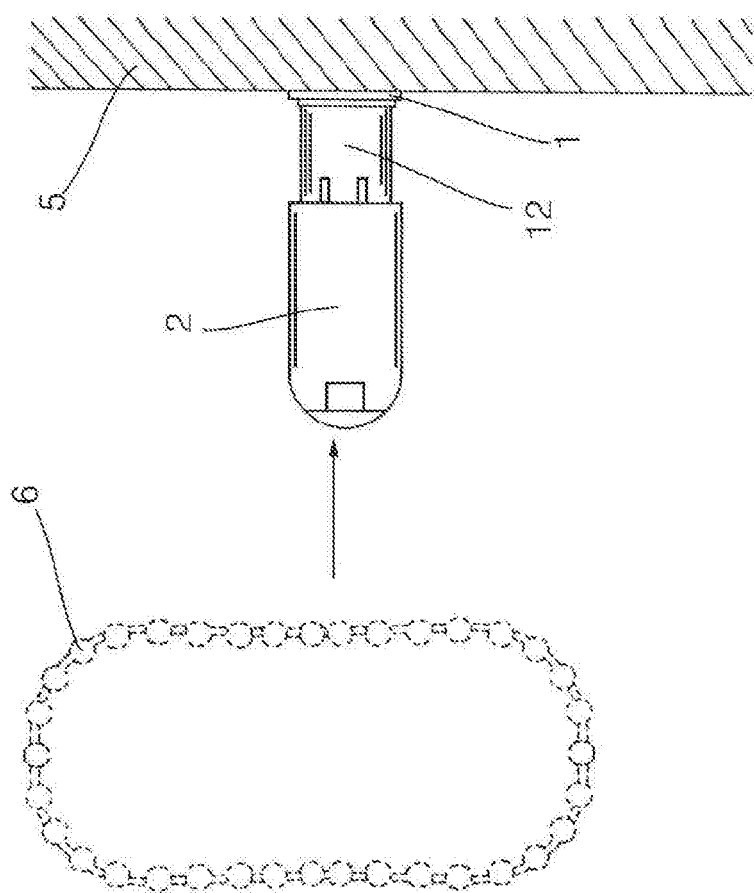
FIG. 5 is a top view showing that a control cord is to be installed into the holder of the present invention.
Figure 6:
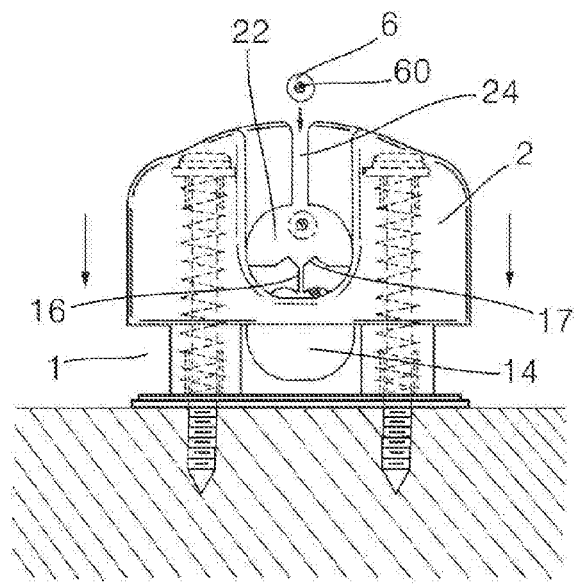
FIG. 6 is a sectional view showing that the control cord is installed into the holder of the present invention.
Figure 7:
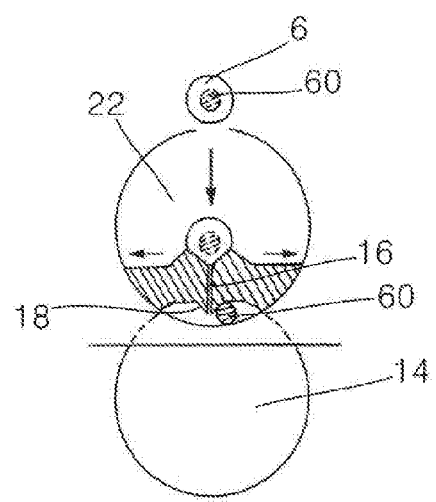
FIG. 7 is a sectional view showing that the control cord is held by the holder of the present invention.
Figure 8:
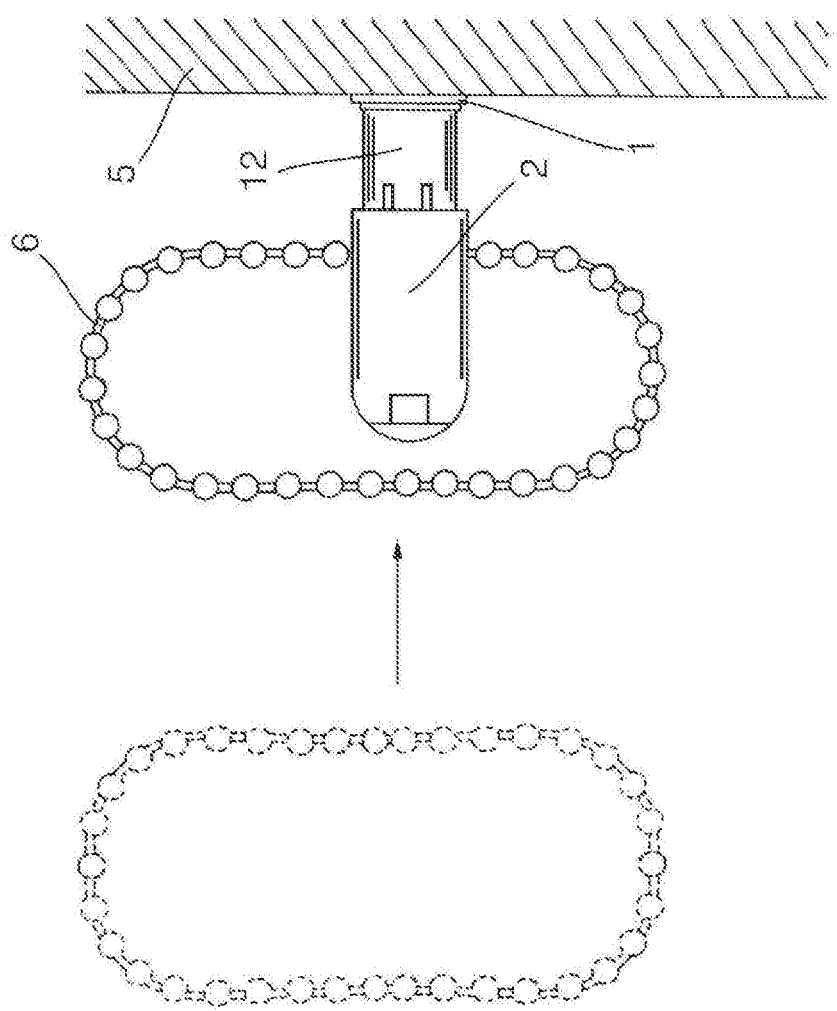
FIG. 8 is a top view showing that the installation of the control cord on the holder of the present invention is completed.
Figure 9:
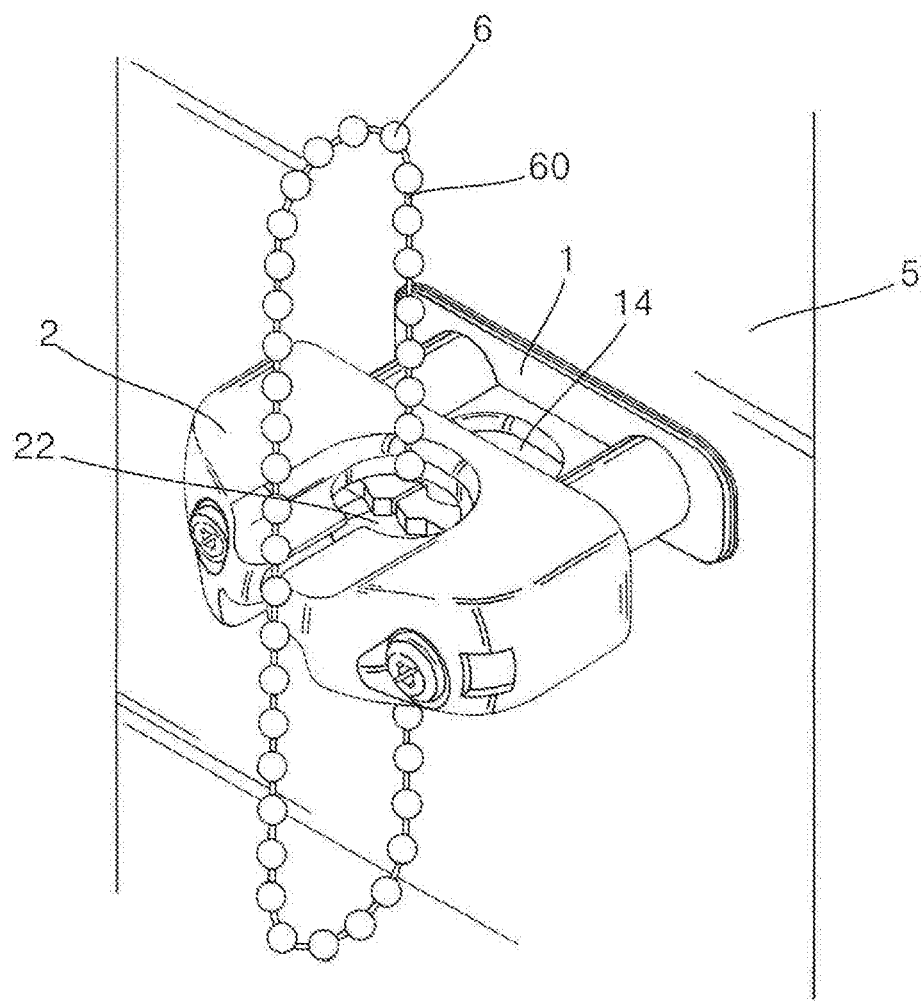
FIG. 9 is a perspective view showing that the control cord is located in the holder of the present invention.
Figure 10:
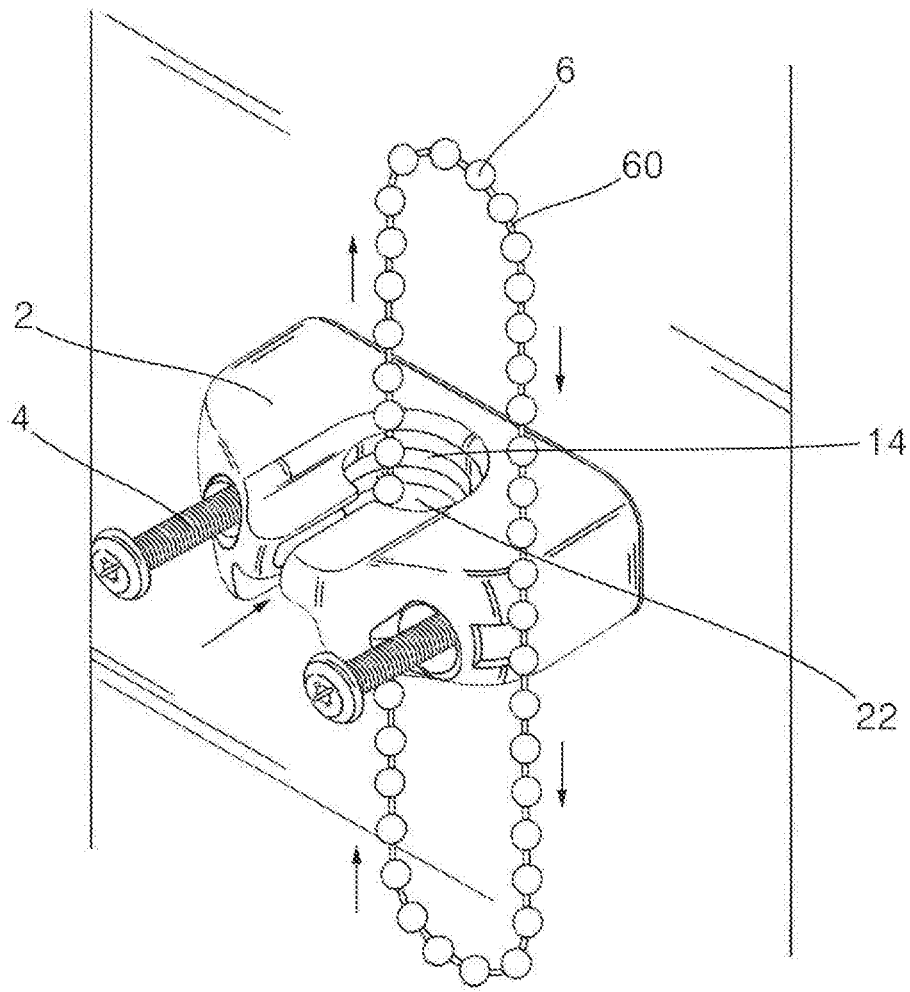
FIG. 10 is a perspective view showing that the control cord is released to operate the curtain.

As shown in FIGS. 5 and 6, when it is desired to lock the loop-shaped seamless control cord 6, the cord section 60 of the seamless control cord 6 is directly passed through the cord passage 24 of the outer cover 2 into the circular perforation 22 of the outer cover 2. Then, the cord section 60 is guided by the guide slope 17 into the cord slit 16 of the base seat. The width of the cord slit 16 is smaller than the diameter of the cord section 60 of the control cord 6. Therefore, when the cord section 60 is pushed in, the cord slit 16 of the base seat will be expanded, permitting the control cord 6 to enter the circular perforation 14 (as shown in FIG. 7). After entering the circular perforation 14, under the restriction of the cord-stop ridge section 18, the cord section 60 of the control cord 6 is hindered from dropping out through the cord slit 16. At this time, due to the elastic abutment of the elastic members 3, the gap between the misaligned circular perforation 22 of the outer cover 2 and the circular perforation 14 of the base seat 1 is reduced to securely hold the cord section 60 (as shown in FIGS. 8 and 9). Under such circumstance, it is impossible to swing or pull the control cord 6. Accordingly, the holder can quickly install and securely locate the control cord 6 to achieve the object of safety.

When it is desired to pull the control cord 6 to operate the curtain, a user only needs to press the outer cover 2 with one hand to align the circular perforation 22 of the outer cover 2 with the circular perforation 14 of the base seat 1. At this time, the misaligned state is changed into an aligned state so that the cord section 60 is released from the holding force. Under such circumstance, the control cord 6 can be freely moved and the user can pull the control cord 6 with the other hand to operate the curtain. After located, the user's hand can let go the outer cover 2, whereby due to the elasticity of the elastic members, the circular perforation 22 of the outer cover 2 is restored to be misaligned from the circular perforation 14 of the base seat 1 and the cord section 60 is held again. Accordingly, the control cord 6 can be truly securely fixed on the wall face to prevent a child from playing the control cord 6 and hinder the control cord 6 from swinging.

The above embodiments are only used to illustrate the present invention, not intended to limit the scope thereof. Many modifications of the above embodiments can be made without departing from the spirit of the present invention.

What is claimed is:

1. A holder for a seamless control cord of a curtain, comprising:
   a base seat, the base seat including a tablet attachable to a wall face, two receiving sockets protruding from a connection section of a front face of the tablet and engagement blocks disposed on outer sides of the receiving sockets for engaging with an outer cover, a platform being integrally connected between the two receiving sockets, a circular perforation of the base seat being formed through the platform between upper and lower faces thereof, a middle line of the platform being formed with a cord slit between the circular perforation and outer edge of the platform;
   an outer cover assembled with the outer end of the base seat, the outer cover having a space for receiving the receiving sockets of the base seat and a circular perforation corresponding to the circular perforation of the platform of the base seat, the outer cover being formed with a cord passage in communication with an inner circumference of the circular perforation and an outer edge of the outer cover, the cord passage of the outer cover being positioned on the same axis as the cord slit of the base seat;
   two elastic members respectively received in the receiving sockets of the base seat and the internal space of the outer cover; and
   two fixing members passed through the outer cover from the outer edge of the outer cover to connect the base seat on the wall face and keep the circular perforation of the base seat misaligned from the circular perforation of the outer cover;
   wherein, when the holder is connected to the wall face, the outer cover is moveable between a first position and a second position;
   wherein, when the outer cover is located in the first position, the outer cover is moved inwardly toward the platform of the base seat, the two elastic members are compressed, the circular perforation of the base seat and the circular perforation of the outer cover are more closely aligned, and the cord is freely moveable in and out of an opening defined by the circular perforation of the base seat and the circular perforation of the outer cover and the cord slit of the base seat and the cord passage of the outer cover; and
   wherein, when the outer cover is located in the second position and the cord is located in the circular perforation of the base seat and the circular perforation of the outer cover, the outer cover is moved outwardly away from the platform of the base seat, the two elastic members are expanded, the circular perforation of the base seat and the circular perforation of the outer cover are increasingly mis-aligned, and the circular perforation of the base seat and the circular perforation of the outer cover engage and fix the cord there between.

2. The holder for a seamless control cord of a curtain as claimed in claim 1, wherein a front end of the cord slit of the base seat is further formed with a guide slope for guiding the control cord into the cord slit.

3. The holder for a seamless control cord of a curtain as claimed in claim 1, wherein a rear end of the cord slit of the base seat is further formed with an extending cord-stop ridge section for preventing the control cord from dropping out of the cord slit.

4. The holder for a seamless control cord of a curtain as claimed in claim 1, wherein tangent lines of two sides of the circular perforation of the outer cover extend to define a structural range of the outer cover, the structural range being a platform structure thinner than a main body of the outer cover.

5. The holder for a seamless control cord of a curtain as claimed in claim 1, wherein the outer edge of the outer cover is formed with an arched body structure for protecting a user.

* * * * *